Patented Mar. 14, 1933

1,901,111

UNITED STATES PATENT OFFICE

REISUKE MASUDA, OF TOLEDO, OHIO, ASSIGNOR TO LARROWE-SUZUKI COMPANY, OF DETROIT, MICHIGAN, A CORPORATION OF OHIO

ANTIFREEZING SOLUTION

No Drawing.   Application filed February 17, 1930. Serial No. 429,212.

The invention relates to anti-freezing compounds such as are used in automobile radiators and in other places where temperature variations extend below the freezing point of water. The invention is based on a discovery that a certain class of organic compounds known chemically as betaines when dissolved in water have the property of greatly lowering the freezing point. Belonging to this class of compounds is a specific substance betaine having the structural formula:

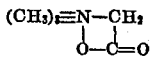

which I find particularly adapted for the purpose.

Betaine in an impure form is a by-product of the beet sugar manufacturing industry. It is contained in the waste water after the sugar has been extracted and is associated with various mineral salts. From this liquid it may be separated in the form of betaine hydrochloride as an incident to the manufacture of other by-products.

Betaine hydrochloride is a substance which has a corrosive effect upon metals and therefore could not be used in automobile radiators. This is also true of betaine in the impure form for the presence of a small quantity of acid or mineral salts will render the material unsuitable for use in contact with metals. Furthermore, as far as I am aware, the anti-freezing characteristic of betaine solutions either pure or impure was not known prior to my discovery.

Betaine is very soluble in water and I have found by experiment with water solutions of various concentrations the depression of the freezing point to be as follows:

| Per cent solution | Freezing point | Boiling point |
|---|---|---|
| 60% | −55° F. | 113° C. (235.5° F.) |
| 50% | −25° F. | 109° C. (228° F.) |
| 40% | − 4° F. | 105° C. (221° F.) |
| 30% | 10° F. | 102° C. (215° F.) | less than 50% solution will be sufficient to prevent freezing under all ordinary winter temperatures. Furthermore, that a solution as weak as 30% will be all that is required excepting in most severe weather. I have also discovered that with the weaker solutions when freezing does occur the water ice crystals will be formed separate from each other instead of in a solid mass so as not to have a bursting effect on the container or to clog the circulatory system. Therefore, the cooling system will be operative even where ice crystals are formed.

Other valuable properties of the solution are first, that it has a boiling point higher than water; second, that there is no loss by evaporation; third, that it will not decompose either by standing or when subject to varying temperatures; fourth, that it is relatively high in surface tension and low in capillary force so that it does not readily pass through small leaks in the container; fifth, that it has no corrosive action on metal surfaces. Thus the material is in every way adapted for use as an anti-freezing compound.

What I claim as my invention is:

1. An anti-freezing liquid comprising a water solution of a betaine.

2. An anti-freezing liquid comprising a water solution of betaine:

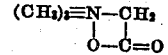

3. An anti-freezing liquid comprising a water solution of less than 50% of betaine.

In testimony whereof I affix my signature.

REISUKE MASUDA.